INVENTORS
HERBERT VELTMAN
PATRICK T. O'KANE
JAMES W. GULYAS
WILLIAM R. MIDDAGH
Agent

United States Patent Office 3,477,927
Patented Nov. 11, 1969

3,477,927
HYDROMETALLURGICAL PROCESS FOR TREATING SULPHIDES CONTAINING NON-FERROUS AND FERROUS METAL VALUES
Herbert Veltman, Edmonton, Alberta, Patrick T. O'Kane, Fort Saskatchewan, Alberta, James W. Gulyas, Edmonton, Alberta, and William R. Middagh, Fort Saskatchewan, Alberta, Canada, assignors to Sherritt Gordon Mines Limited, Toronto, Ontario, Canada, a company of Ontario
Filed Sept. 9, 1966, Ser. No. 578,211
Claims priority, application Canada, Sept. 11, 1965, 940,343
Int. Cl. C22d 1/22
U.S. Cl. 204—119                                8 Claims

ABSTRACT OF THE DISCLOSURE

Zinc and airon bearing sulphides are reacted under oxidizing conditions with an aqueous sulphuric acid solution to produce elemental sulphur and a low iron, zinc bearing solution which is suitable for subsequent recovery of zinc by electrolysis. A rapid rate of reaction is obtained by conducting the reaction at a temperature above the melting point of sulphur and by adjusting the relative amounts of sulphides and acid available for the reaction therewith such that the amount of sulphides present is in excess of that required to supply the zinc values needed to combine stoichiometrically with the available acid.

---

Figure 1:
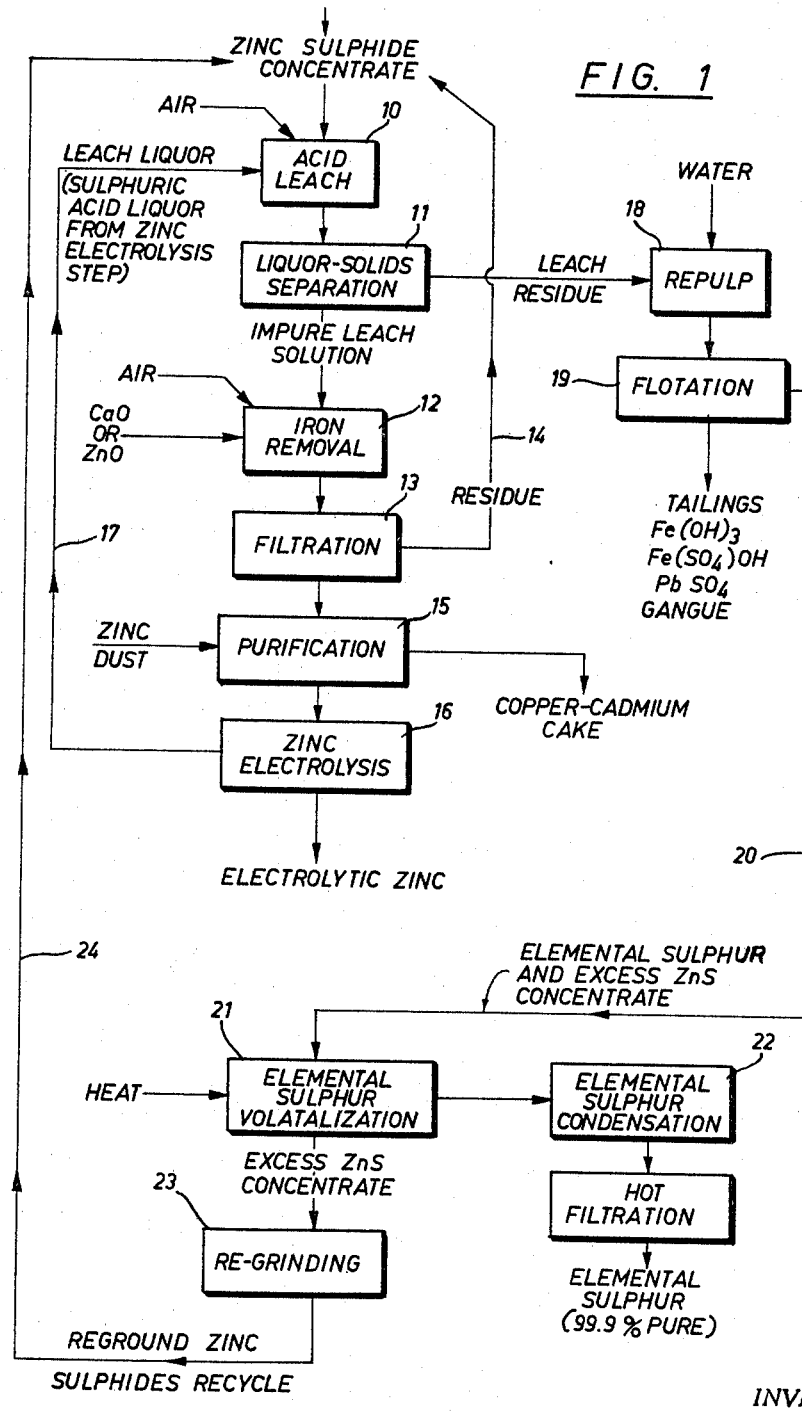

This invention relates to a hydrometallurgical process for the recovery of zinc and sulphur values from zinc and iron bearing mineral sulphides, and, more particularly, it relates to a process wherein such material is treated to produce elemental sulphur and an aqueous solution which contains a predetermined "target" concentration of dissolved zinc and a minimum concentration of dissolved iron.

It is well known, as described in the United States Patent No. 2,996,440, to extract zinc from iron containing zinciferous mineral sulphides by reacting the sulphides with aqueous sulphuric acid and oxygen bearing gas at elevated temperature and pressure. In the process of this patent, the sulphides, in finely divided form, are slurried in aqueous sulphuric acid solution containing free sulphuric acid in amount at least sufficient to combine with the zinc content of the sulphides to form zinc sulphate. The slurry is heated to and maintained at elevated temperature below the melting point of sulphur under an overpressure of oxygen. The heating step is continued until extraction of zinc from the mineral sulphides and concurrent oxidation of sulphide sulphur to elemental sulphur is substantially complete. The leach solution, after purification, is suitable for treatment by conventional procedures such as electrolysis for the recovery of product zinc, and the sulphur, which reports in the leach residue in elemental form, can be recovered as a valuable by-product of the process.

According to this prior art process the leaching reaction is conducted at a temperature below the melting point of sulphur, i.e. below about 119° C. The temperature may optionally be raised above this point and up to about 175° C. after leaching is complete, but if temperatures above the melting point of sulphur are employed in the leaching step, elemental sulphur formed in the oxidation reaction is present in the slurry as liquid sulphur globules. Zinc sulphide particles in the slurry are "wetted" by the liquid sulphur globules and are occluded therein with the result that the particles are protected from further oxidation and the sulphides leaching reaction comes to a standstill. While the use of a temperature below the melting point of sulphur in the leaching step avoids this problem, it has the serious disadvantage that the retention time required to effect extraction of zinc values from the sulphides is undesirably prolonged.

Another disadvantage is that where the sulphides treated contain oxidizable iron, retention time must be prolonged even further in order to effect removal of iron contamination from the leach solution. The iron content of the leach solution should preferably be less than 1 g.p.l. to enable it to be treated in a conventional purification circuit prior to electrolysis. However, during the leaching of sulphides containing iron in a form which is oxidizable under the leach conditions, e.g. iron in the form of pyrrhotite, considerably more than 1 g.p.l. of iron is taken into solution. This iron goes into solution as ferrous sulphide, and the mechanism by which iron in this form is removed from the leach solution involves reactions which are relatively slow under the process conditions of the prior patent.

More specifically, to remove ferrous sulphate from the leach solution it first must be oxidized according to the reaction:

$$2FeSO_4 + 2SO_4 + 1/2O_4 \rightarrow Fe(SO_4)_3 + H_2O \quad (1)$$ 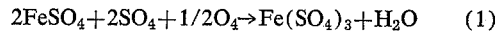

and the ferric sulphate must then be hydrolyzed and precipitated as basic iron sulphate and/or ferric hydroxide according to the reactions:

$$Fe_2(SO_4)_3 + 2H_2O \rightarrow 2Fe(SO_4)(OH)\downarrow + H_2SO_4 \quad (2)$$ 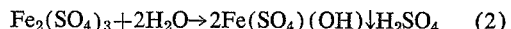

$$Fe_2(SO_4)_3 + 6H_2O \rightarrow 2Fe(OH)_3\downarrow + 3H_2SO_4 \quad (3)$$ 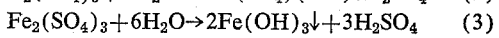

If pH conditions are favourable, i.e. above about 1.2, reactions (2) and (3) proceed rapidly even at low temperatures. However, since the iron must be in the ferric state before reactions (2) and (3) take place, the rate of iron removal is determined ultimately by the rate of iron oxidation as represented by Equation 1, and this reaction is inherently slow under the conditions of the prior process.

The iron oxidation reaction can be accelerated by increasing the temperature, as noted above, if temperatures above 119° C. are used during the leaching step, unoxidized sulphides are occluded by molten sulphur globules. The result of this is that the leaching reaction is prematurely terminated, and since initially at least sufficient acid is provided to stoichiometrically combine with all the zinc values in the sulphides, all available acid is not consumed. This results in pH conditions which are unfavourable to both the iron oxidation and hydrolysis reaction rates.

It has been suggested to avoid the problems of sulphide particle occlusion and at the same time accelerate the iron removal and sulphide leaching reactions by conducting the oxidation reaction at a temperature above 175° C. whereby the elemental sulphur will be oxidized to sulphuric acid. However, this procedure has serious disadvantages. The reaction must necessarily be conducted in more expensive, high pressure corrosion resistant vessels and ancillary equipment. Also, large volumes of sulphuric acid are produced which create disposal problems; and large volumes of oxygen are consumed in the conversion of the sulphide sulphur to sulphate form.

It is thus an essential condition of the above described prior process that the leaching reaction be carried out at a temperature below the melting point of sulphur. In this way the leaching of zinc from the sulphides can be carried substantially to complettion and iron removal by oxidation and hydrolysis can be achieved. However, the prolonged retention times for leaching and iron removal which are inherent in the prior process conditions adversely affect the commercial utility of the process. Prolonged retention times necessitate the use of correspondingly large, expensive autoclaves and ancillary equipment to sustain a commercially attractive rate of sulphides throughput. Because of their large capital costs, the size of the pressure vessels and ancillary equipment required to carry out the process has an important effect on whether the process is commercially competitive.

It is therefore a desirable object to shorten the retention times required for the extraction of zinc values from zinc and iron bearing sulphides by acid leaching and for the removal of undesirable iron contamination from the leach solution.

The present invention achieves this object and overcomes the problems of the prior art by the provision of a process whereby zinc and iron bearing sulphides are rapidly leached with an aqueous sulphuric acid solution to produce elemental sulphur and a leach solution containing a predetermined "target" concentration of dissolved zinc and a low level of iron contamination which permits subsequent treatment of the solution in conventional purification and zinc electrolysis circuits.

According to the invention, aqueous acid-oxidation leaching of zinc and iron being sulphides is conducted at a temperature above the melting point of sulphur but below that temperature at which any substantial portion of the sulphide sulphur is oxidized to sulphate form under conditions wherein the relative amounts of sulphides and available acid are adjusted such that the sulphides are present in excess of the amount required to supply zinc values to combine stoichiometrically with the available acid.

More specifically, the invention comprises the steps of dispersing zinc and iron bearing sulphides in an aqueous sulphuric acid solution to form a slurry; adjusting the relative acid and sulphides concentrations in the slurry such that the amount of acid is sufficient to stoichiometrically combine with available zinc values contained in the sulphides to produce a predetermined target zinc concentration in the solution, and the amount of sulphides is in excess of that required to provide zinc values to combine with the acid as zinc sulphate; reacting the so-adjusted slurry at a temperature above the melting point of sulphur with a free oxygen containing gas provided at an overpressure of oxygen above about 5 p.s.i. to effect consumption of substantially all available acid in the solution with concurrent conversion of zinc values in the sulphides to zinc sulphate and sulphide sulphur to elemental form; continuing the reaction for a period of time sufficient to oxidize the hydrolyzed dissolved iron to precipitate it from solution; separating leach solution containing the target concentration of dissolved zinc from undissolved residue; separating unreacted sulphides and elemental sulphur from the residue; separating the unreacted sulphides from the elemental sulphur and recycling the unreacted sulphides to the slurry adjustment step.

We have found that at temperatures above the melting point of sulphur and in the presence of excess sulphides over that required to provide zinc values for combining stoichiometrically with the available acid, the leaching reaction proceeds at a surprisingly rapid rate until the acid is consumed and the target zinc concentration is in solution. Although molten sulphur globules are present in the reaction vessel, they do not adversely affect the leaching rate.

In addition, iron removal is effected very rapidly as a result of the higher operating temperatures and the rapid and complete consumption of the sulphuric acid by the excess sulphides which produces pH conditions favourable for rapid iron oxidation and hydrolysis.

In result, the process of this invention very substantially reduces the retention time heretofore required to produce a low iron zinc bearing solution suitable for subsequent treatment in conventional leach solution purification and electrolytic zinc recovery circuits.

The invention is discussed in detail hereinafter by reference to the accompanying drawings in which:

FIGURE 1 is a flow sheet illustrating the invention as incorporated in an overall process for the recovery of zinc metal and elemental sulphur from zinc sulphide concentrate.

Figure 2:
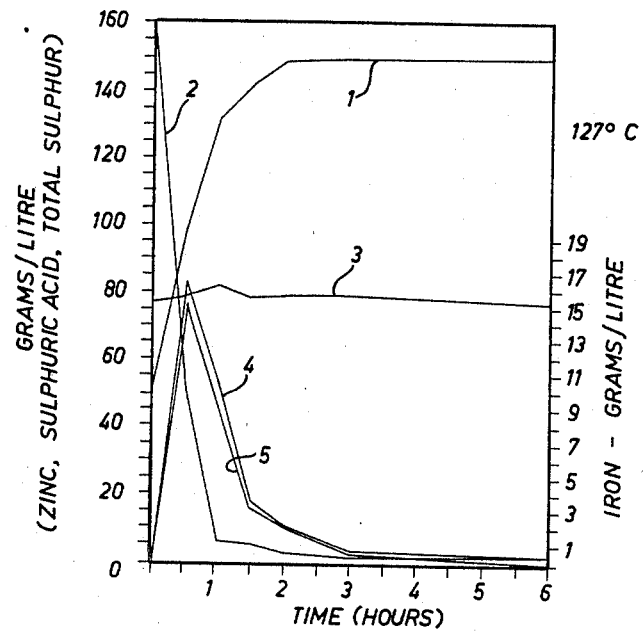
Figure 3:
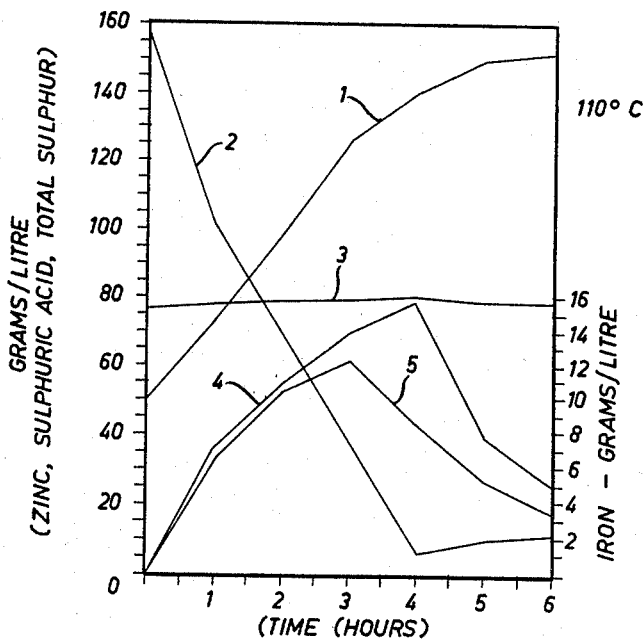

FIGURES 2 and 3 graphically depict specific results obtained in the treatment of zinc and iron bearing sulphides by the method of the present invention and by the method of the prior art, respectively.

In carrying out the process, the starting material is dispersed in an aqueous sulphuric acid solution to form a slurry which is adjusted to contain the required amounts of acid and sulphides. The starting material may be a whole ore but ordinarily, this would be wasteful of apparatus capacity. Thus, for all practical purposes, the feed to the process will be either a high grade zinc bearing sulphide ore or ore concentrate. The starting material is finely pulverized to expose maximum surface area to the leaching reagents. Preferably, the particle size should be in order of about 80%–200 mesh Tyler screen.

The amount of acid provided is determined by the "target" zinc concentration desired in the final leach solution. Sufficient acid must be available to combine as soluble sulphate with zinc values contained in the sulphides to produce the desired target concentration of dissolved zinc. It is generally desirable to produce a leach solution containing about 150 grams per litre of zinc since in most cases zinc will be recovered from the solution of electrolysis and 150 g.p.l. is the preferred concentration for the electrolysis step. Once the desired zinc target concentration is determined, the amount of acid required to produce this concentration can be readily calculated having regard to the stoichiometric requirements of the zinc to be extracted as zinc sulphate. In most cases, the leach solution will be recycled liquor obtained from the zinc electrolysis step. This liquor will normally contain regenerated sulphuric acid equivalent to the amount of dissolved zinc metal recovered in elemental form. Accordingly, except for initial make up acid, total acid requirements for the leaching step when conducted on a continuous basis in conjunction with electrolytic zinc recovery, are limited to that amount needed to compensate for mechanical losses and losses to acid reactive diluent materials in the sulphides, such as lead, which form insoluble sulphates.

The amount of sulphides provided must be in excess of that amount required to provide the zinc values which will combine stoichiometrically with the available acid to produce zinc sulphate. Preferably, the amount of sulphides should be between about 20% and 60% in excess of that required to provide the stoichiometric zinc requirements. An excess greater than 60% may be used but the pulp density and the amount of recycled sulphides may become excessive, resulting in agitation and handling problems.

Referring to FIGURE 1, in the leaching step 10 the adjusted acid-sulphides slurry is heated with agitation at a temperature above about 119° C. but below that temperature at which any substantial portion of the sulphide sulphur is oxidized to sulphate form. Preferably, the operating temperature should be about 125° C. to about 160° C. At temperatures above about 150° C. sulphuric acid commences forming due to the oxidation of elemental sulphur. It should be noted, however, that generation of some acid may be desirable in some cases to compensate for mechanical acid losses and replace make up acid consumed by diluent metals such as lead and gangue materials such as calcium and magnesium.

The leaching can be carried out on a batch or continuous basis in accordance with conventional procedures for handling systems of solids and acid solution at elevated temperature and pressure. In any case, leaching should be carried out with suitable agitation to promote contact between the solid, liquid and gaseous phases in the reaction vessel in order to produce optimum reaction rates.

The ratio of solids to solution also influences the reaction rates. Reaction rates are reduced as pulp density is increased beyond the level where optimum dispersion of the solids and oxygen in the solution can be maintained. The precise pulp density in any given operation is determined having regard to the zinc concentration of the sulphides, the desired target metals concentration for the leach end solution and the necessity for maintaining an excess of sulphides over the amount required to provide the zinc values for combination with the available acid. In general, the pulp density of the slurry should be within the range of 20% to 50%.

The reactions proceed satisfactorily with an oxygen overpressure above about 5 pounds per square inch. However, there is an improvement in zinc extraction rate and iron hydrolysis rate as the oxygen overpressure is increased. Thus, it is preferred to use an overpressure of oxygen above about 20 pounds per square inch. The upper limit of oxygen pressure will be that imposed by the apparatus employed. As it is generally desirable to avoid the use of costly high pressure apparatus, generally the upper limit will be about 100 p.s.i. oxygen overpressure or about 500 p.s.i. are overpressure.

Under the conditions described above and in the presence of the excess sulphides, leaching proceeds very rapidly until substantially all available acid is consumed and dissolved ferrous iron is rapidly oxidized and hydrolyzed. Thus, the target zinc concentration and low iron level are reached with minimum retention time.

When substantially all available acid has been consumed and the dissolved iron content of the solution reduced to a minimal level (usually about 1.0 g.p.l. or less), the slurry is discharged from the reaction vessel into a flash tank or the like apparatus. Upon discharge, the slurry rapidly cools to a temperature below the solution boiling point and molten sulphur present in the slurry solidifies in the form of pellets with unleached sulphides occluded therein. Gangue material, such as silica, and substances oxidized in the reaction, such as ferric hydroxide, basic ferrous sulphate and lead sulphate, are not wetted and occluded by the molten elemental sulphur and report in the residue in the form of a distinct and separate sludge-like material.

The leach solution containing the desired target zinc concentration is separated from the undissolved residue in liquid-solid separation step 11 and is passed to solution purification and zinc recovery operations. The precise purification steps will vary depending on the composition of the material treated and the purity specifications for the zinc recovery operation. In the process illustrated in FIGURE 1, residual iron, which will normally be about 1.0 gram per litre or less, is rapidly precipitated in iron removal step 12 by the addition of small amounts of calcium oxide or zinc oxide as a neutralizing agent and air or manganese dioxide as an oxidizing agent. The precipitate, after separation in filtration step 13 is recycled to the acid leach step 10 as shown by line 14. The iron-free solution is then treated in purification step 15 to remove undesirable contaminant metals taken into solution along with the zinc in the oxidation step. For example, impurities such as copper, cadmium, etc. normally occur in zinc sulphide concentrates and are taken into solution under the specified leach conditions. These contaminants are removed in step 15 by known procedures, for example, by addition of zinc dust to the solution.

The solution, after separation of precipitated contaminants in step 15 is passed to the zinc electrolysis step 16 where dissolved zinc is recovered in a conventional manner. The spent liquor from the electrolysis step, which contains regenerated sulphuric acid equivalent in amount to the zinc recovered, is recycled as shown by line 17 of the flow sheet to provide make-up acid for the leaching step 10.

The leach residue from liquid-solid separation step 11 contains unleached sulphides which must be separated from the elemental sulphur and other solid residue and recycled to the leaching step 10. For this purpose, the leach residue is repulped with water as shown in step 18 and subjected to a froth flotation operation 19. Flotation step 19 can utilize any conventional sulphide flotation techniques which are well known in the minerals separation art. The tailings from flotation step 19, which contain basic iron sulphate, gangue materials and insoluble non-ferrous metal sulphates, such as $PbSO_4$ can be discarded or treated to recover values such as lead and precious metals, if present.

The flotation concentrate containing substantially all of the elemental sulphur and unleached sulphides is passed, as shown by line 20, to sulphur extraction step 21 where the elemental sulphur is separated from the metal sulphides. There are a number of methods which can be employed for this purpose. In the embodiment shown in FIGURE 1, sulphur is separated from the sulphides by volatilization, the sulphur is condensed as shown at 22, hot filtered and recovered as a 99.9% pure by-product. Sulphides from the volatilization step are re-ground in step 23 and recycled to the leaching step 10 as shown by line 24.

As alternative to the volatilization procedure for separating unleached sulphides and elemental sulphur, solvent extraction of sulphur with a suitable solvent such as carbon disulphide may be employed.

The invention is further explained and illustrated by the following examples.

EXAMPLE 1

A zinciferous mineral sulphide concentrate derived from the flotation of a marmatite bearing ore contained after grinding: Zn—47.8%; Pb—6.2%; Fe—11.2%; Cu—0.23%; S—33.8%; balance insoluble.

An artificial return electrolyte was prepared which contained 50 g.p.l. of zinc as zinc sulphate and 156 g.p.l. of sulphuric acid. To a number of 6000 ml. samples of this artificial electrolyte were added 1889 grams of the concentrate, i.e. an amount approximately 50% in excess of that required to raise the zinc concentrate to the "target" of 150 g.p.l.

Each mixture was placed in a 2 gallon lead-lined autoclave equipped with a titanium impeller, thermowell and sample line. The autoclave was sealed and the air purged with oxygen. The mixture was heated with agitation to 127° C. and a 20 p.s.i. overpressure of oxygen applied. The reaction was continued for 6 hours during which time samples were withdrawn from the autoclave at convenient intervals. The samples were filtered and the solution and residue analyzed. The results of the leaching step are graphically depicted in FIGURE 2.

EXAMPLE 2

For purposes of comparison, the procedure of Example 1 was repeated for another series of tests except that the temperature was maintained at 110° C. (the preferred temperature of the prior art process described in U.S. Patent No. 2,996,440) and the quantity of sulphides was adjusted such that there was a 10% excess of acid over that required to combine with the non-ferrous metals contained in the sulphides as sulphates. The results of these tests are shown in FIGURE 3.

Referring to the graphs depicted in FIGURES 2 and 3, in each case curve 1 represents the concentration of zinc in solution, curve 2 represents the sulphuric acid concentration in the reaction zone and curve 3 is the total sulphur in solution. Curves 4 and 5 represent the concentration of total iron and ferrous iron respectively in solution.

It can be noted from curve 1 in FIGURE 3 that in the prior art process relatively rapid zinc leaching takes place in about the first 3 hours at a rate of about 25 g.p.l./hr. after which time a tailing off of the leaching rate occurs. Curve 2 shows that the greatest part of the acid is consumed within about 4 hours. In the initial stages of the leach, iron goes into solution with the zinc. After about 4 hours of leaching, the acid has been consumed, the pH increases and the hydrolysis and precipitation of ferric iron commences as shown by curves 4 and 5. The hydrolysis of ferric iron is a rapid reaction even at relatively low temperatures. It is the slower rate of oxidation of the ferrous iron to the ferric state which controls the rate of iron precipitation. Initially, the iron precipitates from solution at an accelerated rate (about 8 g.p.l./hr.) but shortly after iron precipitation has commenced, a tailing off in precipitation rate occurs as shown by curves 4 and 5. At an overall retention time of about 6 hours, the iron content of the leach solution is only lowered to about 5 grams per litre. An additional 3 hours at least is required to lower iron to 1.5 g.p.l. or less.

On the other hand, reference to FIGURE 2 shows that by the method of this invention, the rate of zinc leaching, curve 1, is accelerated to 80 grams per litre per hour for the first 2 hours. The tailing off of the zinc leaching rate is reduced substantially such that the target zinc concentration is reached after only about 2 hours. FIGURE 3 shows that the prior art process required 3 hours to increase the zinc concentration from about 130 g.p.l. to 150 g.p.l. whereas the same result is accomplished in 1 hour by the method of the invention as shown by curve 1 in FIGURE 2. The decrease in time required to effect iron removal is equally dramatic. Curves 4 and 5 in FIGURE 2 show that iron was lowered to less than 1 g.p.l. after only 3 hours retention time. Thus, a substantially iron-free leach solution containing a target zinc concentration of 150 g.p.l. is produced by the method of the invention with less than ⅓ the retention time required by the prior art process.

It will be understood that the process is applicable to other zinc and iron bearing sulphides besides ore concentrates of the type treated in Examples 1 and 2. The term "zinc and iron bearing sulphides" as used herein includes all sulphidic ores and concentrates which contain zinc in the form of complex or simple sulphide compounds and iron in a form which is oxidizable under the leaching conditions of the process. The iron may be combined with the zinc as a complex sulphide such as it is in the case of marmatite ((Zn,Fe)S), or the iron and the zinc may be present as separate minerals, e.g. a mixture of sphalerite (ZnS) and pyrrhotite (FeS) or sphalerite and iron oxide. The term is also intended to include zinc and iron bearing sulphidic materials which have been partially roasted or otherwise pre-treated to render them amenable to oxidation in aqueous acid media. For example, zinc bearing pyritic materials may be treated in an atmosphere free of oxygen or containing less than half the stoichiometric amount of oxygen necessary to convert all the sulphide sulphur bound to the pyrite to sulphur dioxide, leaving a product having a composition similar to pyrrhotite which is readily oxidizable in accordance with the present invention.

It will be understood, also, that other modifications can be made in the preferred embodiment of the present invention as described hereinabove without departing from the scope and purview of the appended claims.

What we claim as new and desire to protect by Letters Patent of the United States is:

1. A process for treating zinc and iron bearing sulphides to produce elemental sulphur and a solution containing a low level of iron contamination and a predetermined target concentration of dissolved zinc which permits subsequent treatment of the solution by electrolysis for recovery of zinc which comprises the steps of dispersing the sulphides in an aqueous sulphuric acid solution to form a slurry; adjusting the relative acid and sulphides concentrations in said slurry such that the amount of acid is sufficient to stoichiometrically combine with available zinc values contained in the sulphides to produce said predetermined target zinc concentration in solution, and the amount of sulphides is in excess of that required to provide zinc values to combine with said acid as zinc sulphate; reacting the so-adjusted slurry at a temperature above the melting point of sulphur with a free oxygen containing gas under an overpressure of oxygen above about 5 p.s.i. to effect consumption of substantially all available acid with concurrent leaching of zinc values and conversion of sulphide sulphur to elemental form; continuing said reaction to oxidize and hydrolyze dissolved iron to precipitate it from solution; and separating leach solution containing said predetermined target concentration of dissolved zinc from undissolved residue.

2. The process according to claim 1 wherein the reaction temperature is within the range of 125° C. to 160° C.

3. The process according to claim 1 wherein the amount of sulphides provided is about 20% to about 60% in excess of that required to provide zinc values to combine stoichiometrically with the available acid as zinc sulphate.

4. The process according to claim 1 wherein the reaction is continued until the amount of iron in solution is less than about 1 gram per litre.

5. The process according to claim 1 wherein the oxygen over-pressure is within the range of about 20 p.s.i. to about 100 p.s.i.

6. The process according to claim 1 wherein the dissolved zinc is recovered from solution by electrolysis and the electrolytic end solution is recycled to the slurry adjustment step.

7. The process according to claim 1 wherein the unreacted sulphides and elemental sulphur are separated from the leach residue by froth flotation, elemental sulphur is volatilized to separate it from the unreacted sulphides and said sulphides are re-ground and returned to the slurry adjusting step.

8. The process according to claim 1 wherein unreacted sulphides and elemental sulphur are separated from the elemental sulphur and the separated sulphides are recycled to the slurry adjustment step.

References Cited

UNITED STATES PATENTS

| | | | |
|---|---|---|---|
| 1,937,636 | 12/1933 | Christensen | 204—119 |
| 2,996,440 | 8/1961 | Forward et al. | 204—119 |
| 3,316,059 | 4/1967 | Vizsolyi et al. | 23—125 |

JOHN H. MACK, Primary Examiner

H. M. FLOURNOY, Assistant Examiner

U.S. Cl. X.R.

75—115, 120